United States Patent [19]

Kim et al.

[11] Patent Number: 5,500,577
[45] Date of Patent: Mar. 19, 1996

[54] RASTER FORMAT CONVERTER CIRCUIT

[75] Inventors: Beom S. Kim, Seoul; Jin H. Lee, Kyungki-do; Kyoung B. Koo, Seoul, all of Rep. of Korea

[73] Assignee: Hyundai Electronics Industries Co., Ltd., Kyungki-DO, Rep. of Korea

[21] Appl. No.: 171,613

[22] Filed: Dec. 22, 1993

[30] Foreign Application Priority Data

Dec. 31, 1992 [KR] Rep. of Korea ................. 92-27241

[51] Int. Cl.⁶ ................. H01J 29/70; H01J 29/72; H04N 7/01
[52] U.S. Cl. ................. 315/364; 348/448; 348/452; 348/459
[58] Field of Search ................. 315/364; 348/426, 348/429, 430, 441, 443, 448, 452, 449

[56] References Cited

U.S. PATENT DOCUMENTS 4,654,696  3/1987  Dayton .
5,412,428  5/1995  Tahara ................. 348/396
5,428,397  6/1995  Lee et al. ................. 348/448

*Primary Examiner*—Theodore M. Blum
*Attorney, Agent, or Firm*—Watson Cole Grindle & Watson

[57] ABSTRACT

Concerning raster converter circuit on HDTV, this invention is used to store datas to frame memory when datas converted into block unit on digital HDTV shall be displayed and also used as address generator in order to convert data format into raster scan method through frame memory when, by using blocktransform including DCT, VQ etc., data format with raster scan method from camera shall be displayed on screen with making up data by block unit which is convenient to condense data through frame memory, and can be applicable for all systems using blocktransform of DCT, VQ etc., i.e. HDTV, ATV, MPEG, JPEG & Videophone etc.

11 Claims, 9 Drawing Sheets

BLOCK 1

|        | a e . . | A E . . |  |
|--------|---------|---------|--|
| SLICE 1 | | | |
| SLICE 2 | b f . . | B F . . | |
| SLICE 3 | c g . . | C G . . | |
| SLICE 4 | d h . . | D H . . | |

RASTER FORMAT CONVERTER CIRCUIT

BACKGROUND OF THE INVENTION

1. Field of the Invention

As this invention is used to store data to frame memory when the data converted into block unit on digital HDTV(ATV) shall be displayed and also used as an address generator to convert data format into raster scan method via frame memory when, by using blocktransform including DCT(DISCRETE COSINETRANSFORM), VQ(VECTOR QUANTIZATION) etc., data format with raster scan method coming from camera shall be changed to data format of block unit, which is convenient to condense, through frame memory or data composed of block unit shall be displayed on screen after restoring the condensed data, it is concerning raster format converter circuit of HDTV applicable for all systems, which use blocktransform or DCT, VQ etc., i.e. HDTV(High Definition Television), ATV(Advanced Television), MPEG(Moving Picture Experts Group), JPEG(joint Photographic Experts Group), Video Phone etc.

2. Description of the Prior Art

In general, ATV(Advanced Television) is aimed to realize highly precise and large sized screen with increasing scanning line number more than twice and also aspect ratio comparing with the existing television.

With basic frame of 1125 scanning line number, 1025 active scanning line, 60 Hz field frequency, 2:1 interlaced scanning, 16:9 aspect ratio, pixel number, 1920 luminance signal, 960 color difference signal, its standardization is being led by CCIR(Comittee Consutatif International des Radiocommunications).

For one example of such HDTV art, the American patent application Ser. Nr. 07/721515 by The Glass Valley Group Inc. can be illustrated.

As a video signal communication method which transmits together data appointing the deleted part on wide screen and according to the transmit ted signal possibly receives via general TV with narrow screen, when receiving in the form of regular order after each time extruding of luminance component(Y) & color component(C1, C2) corresponding to TV signal of wide aspect ratio, this is developed under consideration of the interchangeability with MTSC television system.

Accordingly, as such existing art is for the interchangeability with NTSC television system, it could not suggest the art to convert data format into raster scan method through frame memory.

The purpose or this invention is to offer raster format converter system used as an address generator in frame memory, in HDTV condensing image data by using blocktransform including DCT(DISCRETE COSINE TRANSFORM), VQ(VECTOR QUANTIZATION) etc., and then to offer the method of luminance signal processing & color difference signal processing.

SUMMARY OF THE INVENTION

For this, raster format converter system of this convention consists or: 10 bit counter that uses "ON" signal which activates as "High" during data existing period so that can be counted only during the period while does as "Low" during data non-existing period, also uses macroblock start signal(MSC) which resets in the starting point of macroblock, and is used to count one macroblock; Y processor making horizontal & vertical address of luminance signal(Y) by using the said counter & slice number(SVP), macroblock number(MACRO #); C processor making horizontal, vertical address & luminance address of color difference signal(C) by using the said 10 bit counter and slice number(SVP), macroblock number(MACRO #); the 1st multiplexer that selects vertical address and offer Y address during luminance signal period and C address during color difference signal period; the 2nd multiplexer that selects and offers vertical address with selecting Y address during Y period and C address during C period.

Furthermore, the luminance signal processing method of this invention consists of: the 1st process that increases luminance vertical address until 8 line data is inputted with repeated input of 4 parallel data by 4 slices in regular order; the 2nd process that, after 8 line data input, first increases horizontal address until 4 block datas are inputted and also increases other illuminance vertical address and then increases until 8 block datas are all inputted; subsequently the 3rd process that, by using macroblock number, increases the rest luminance horizontal address until 44 macroblocks are all inputted: the 4th process that then repeats to increase the rest luminance vertical address by 4 slices in turn.

Moreover, the color signal processing method of this invention consists of: the 1st process that repeats to input 4 parallel datas by 4 slices in regular order and then increases color difference address until 8 line data is inputted: the 2nd process that, after 8 line data input, first increases other color difference horizontal address until 4 block datas are inputted and then counts 4 blocks: subsequently the 3rd process that, by using macroblock number, increases the rest color difference horizontal address until 44 macro blocks are all inputted; then the 4th process that repeats to increase the rest color difference vertical address by 4 slices in turn.

DESCRIPTION OF THE DRAWINGS

FIG. 4 is the first block diagram from slice 1 to slice 4 in frame.

DETAILED DESCRIPTION OF THE INVENTION

Figure 5:
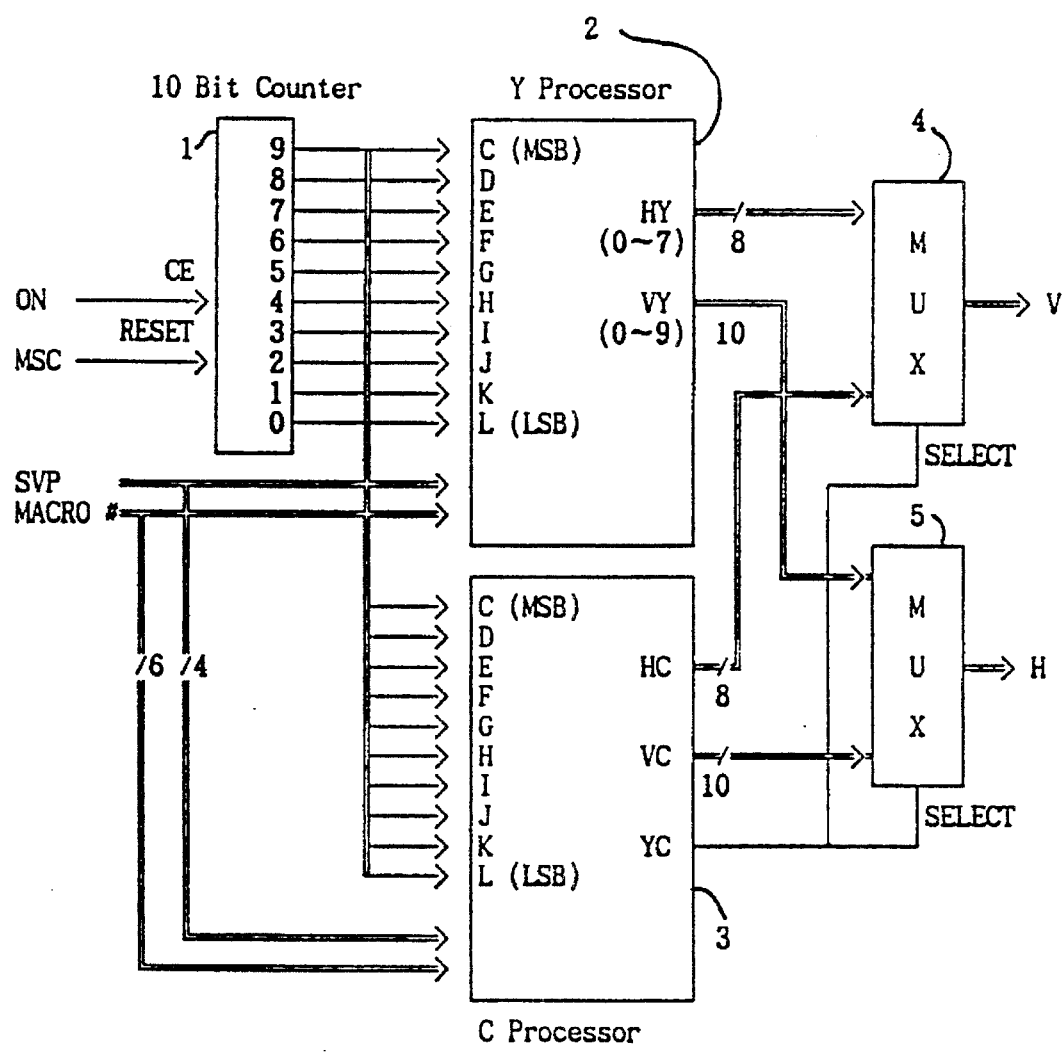
FIG. 5 is the raster format converter circuit diagram of this invention.

As FIG. 5 is the schematic diagram of raster format converter which is used as an address generator of frame memory in the system condensing image data by using blocktransform including DCT(DISCRETE TRANSFORM), VQ(VECTOR QUANTIZATION) etc., this consists of: 10 bit counter(1) which uses "ON" signal which activates as "High" during data exisitng period so that can be counted only during the period, while does as "Low" during data non-existing period, also uses macroblock start signal(MSC) which resets in the starting point of macroblock, and is used to count one macroblock: Y processor making horizontal & vertical address of luminance signal by using 10 bit counter(1) & slice number(SVP), macroblock number(MACRO #): C processor(3) making horizontal, vertical address of color difference signal(C) by using 10 bit counter and slice number(SVP), macroblock number(MACRO #): the 1st multiplexer(4) that is used for offering vertical address with selecting Y address during Y period and C address during C period: the 2nd multiplexer(5) that is used for offering horizontal address with selecting Y address during Y period and C address during C period.

Figure 6:
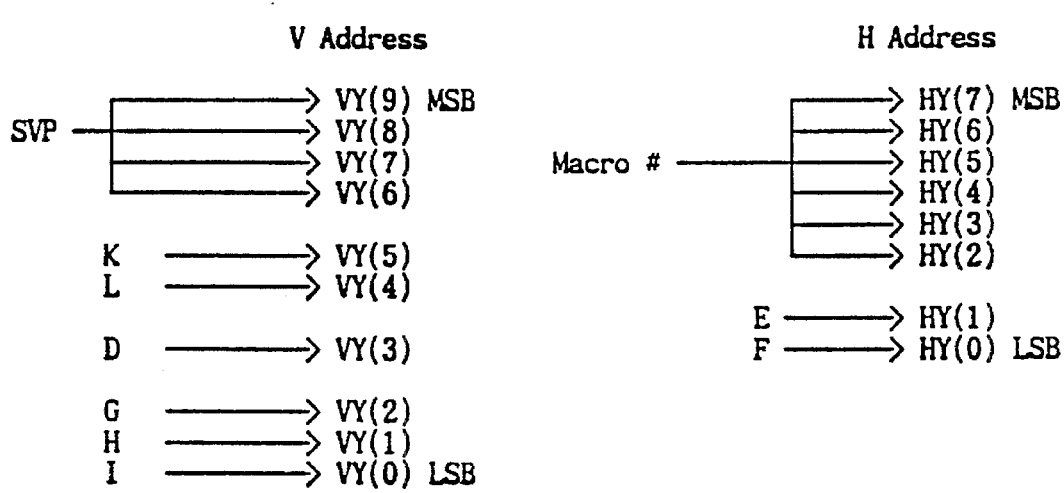
FIG. 6 is the Y processor schematic diagram producing Y address in raster format converter of this invention.
Figure 7:
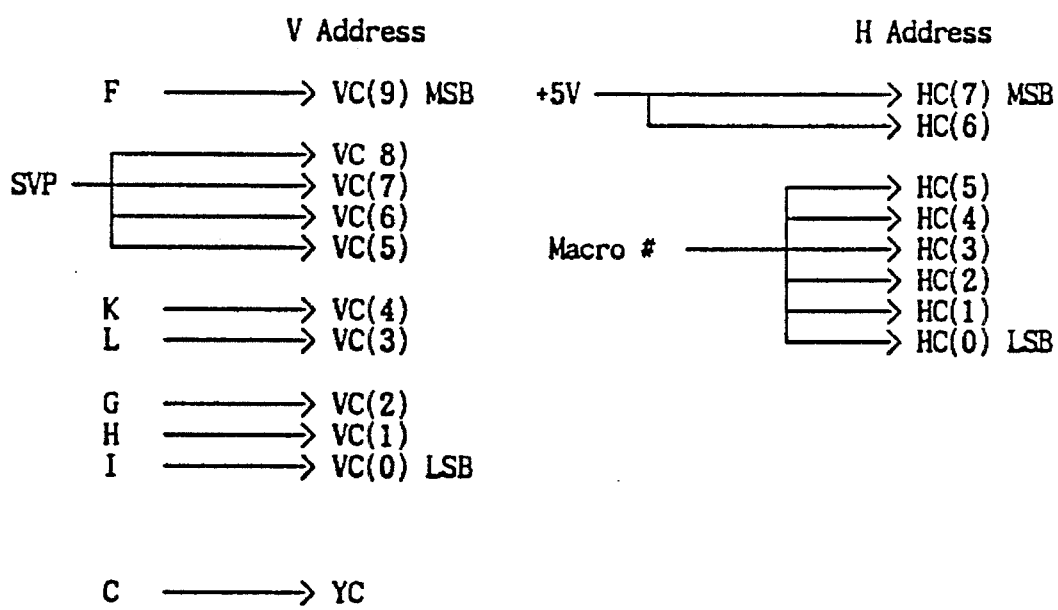
FIG. 7 is the C processor schematic diagram producing C address in raster format converter of this invention.

As FIG. 6 and 7 are the schematic diagrams of Y processor & C processor(3) consisting of this invention, for Y processor(2) slice number(SVP) shall be used as max. 4 bit VY(9)~VY(6) of Y vertical address while for C processor(3) as C vertical address(VC(8)~VC(5)); in C processor(3) the max. bit(MSB) of 10 bit counter(l) shall be used as signal(YC) to distinguish Y and C period: in Y processor(2) macroblock number(MACRO #) shall be used as max. 6 bit(HY(7)~HY(2)) of Y horizontal address, while in C processor(3) macroblock number (MACRO #) as min. 6 bit(HC(5)~HC(O)) of C horizontal address. And in Y processor(2) in order to increase 4 slices in turn 2 bit(K, L) of 10 bit counter(l) shall be used as Y vertical address (VY(5), VY(4)) while in C processor(3) for the same purpose as the said 2 bit(K, L) of counter(1), used as C vertical address(VC(4)), VC(3)): in Y processor(2) in order to count 8 lines within block middle bit(G, H, I) of 10 bit counter(1) shall be used as min. 3 bit(VY(2), VY(1), VY(0)) of Y vertical address, while in C processor(3) for the same purpose as the aforementioned middle bit(G, H, I) of 10 bit counter(1) used as min. 3 bit(VC(2), VC(1), VC(0)) of C vertical address.

Furthermore, it is also composed of: in Y processor(2) so as to count horizontal 4 blocks middle bit(E, F) of 10 bit counter(1) shall be used as min. 2 bit(HY(1), HY(0)) of Y horizontal address: in order to distinguish between 4 top and 4 bottom blocks of illuminance signal Y, D of 10 bit counter (1) shall be used as Y vertical address(VY(3)); in C processor (3) so as to store color difference signal(U, V) data in frame memory in different field from illuminance signal (Y), max. 2 bit HC(7), HC(6) of C horizontal address shall be set as "High" and in order to store U & V datas in frame memory in different field from each other, F of 10 bit counter(l) be used as max. bit VC(9) of C vertical address.

This invention with the above composition can be explained as follows.

Figure 1:
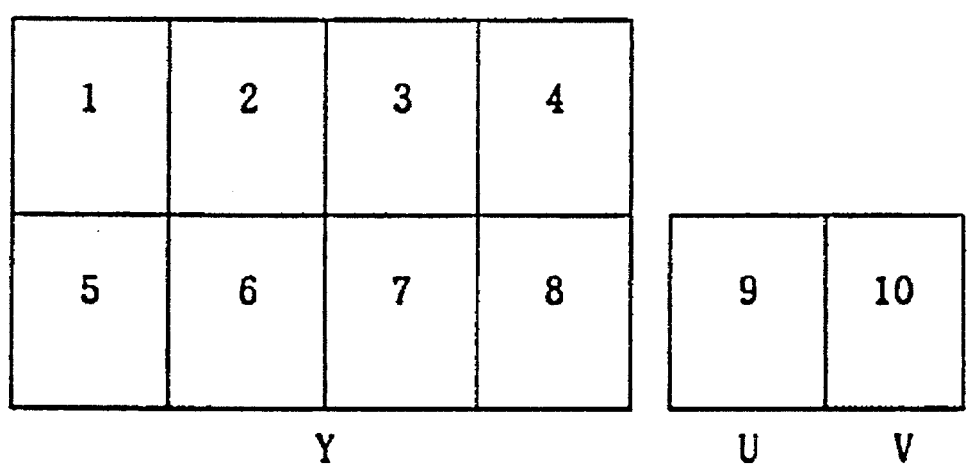
FIG. 1 is the schematic diagram of macroblock.

The video data for HDTV in this invention shall have a hierarchical structure so as to be advantageous to DCT(DISCRETE COSINE TRANSFORM) and motion compensation. i.e. the structure from small unit to block, macroblock, slice, frame. 1 block is composed of horizontal 8 pixel, 8×8 of vertical 8 line and 1 macroblock is of luminance signal 8 block like FIG. 1, color difference signal 2 block(U, V, each 1 block). Consisting of 44 macroblocks, 1 slice is of same frame as FIG. 2. Then Y(luminance signal), U(color difference signal), V(color difference signal) shall have 60 slices resp. and each slice have 44 macroblocks. As the memory memorizing such frame can be illustrated like FIG. 3, by using max. bit of horizontal & vertical address, the addresses of Y, U, V shall be distinguished as follows:

|   | Horizontal address | Vertical address |
|---|---|---|
| Y | 00XXXXXXXX | XXXXXXXXXX |
| Y | 01XXXXXXXX | XXXXXXXXXX |

-continued

|   | Horizontal address | Vertical address |
|---|---|---|
| Y | 10XXXXXXXX | XXXXXXXXXX |
| U | 11XXXXXXXX | 0XXXXXXXXX |
| V | 11XXXXXXXX | 1XXXXXXXXX |

In this invention, in order to do data processing speed fast the circuit is composed of 4 step parallel processing method and the memory, considering motion compensation, is divided into even & odd memory. FIG. 4 shows the first block(block 1) from slice 1 to slice 4. The first 4 pixels of slice(1~4), i.e. a in slice 1, b in slice 2, c in slice 3, d in slice 4, are stored in even memory, while the second 4 pixels of slice(1~4), i.e. A in slice 1, B in slice 2, C in slice 3, D in slice 4 stored in odd memory. The storage order to memory is in order of a, b, c, d, A, B, C, D, e, f, g, h, E, F, G, H, and a, b, c, d, e, f, g, h, to even memory while A, B, C, D, E, F, G, H, to odd memory are stored resp.

In this way, store 1~8 block in FIG. 1 in turns and, as block 9 is U(color difference signal), fix max. 2 bit(HC(7), HC(6) in FIG. 7) of horizontal address as '11', also fix max. 1 bit of vertical address as '0' and then store in the same way as FIG. 4. As block 10 is V(color difference signal), furthermore, fix max. 2 bit of horizontal address as '11', also fix max. 1 bit of vertical address as '1' and then store in the same way as FIG. 4.

Figure 2:
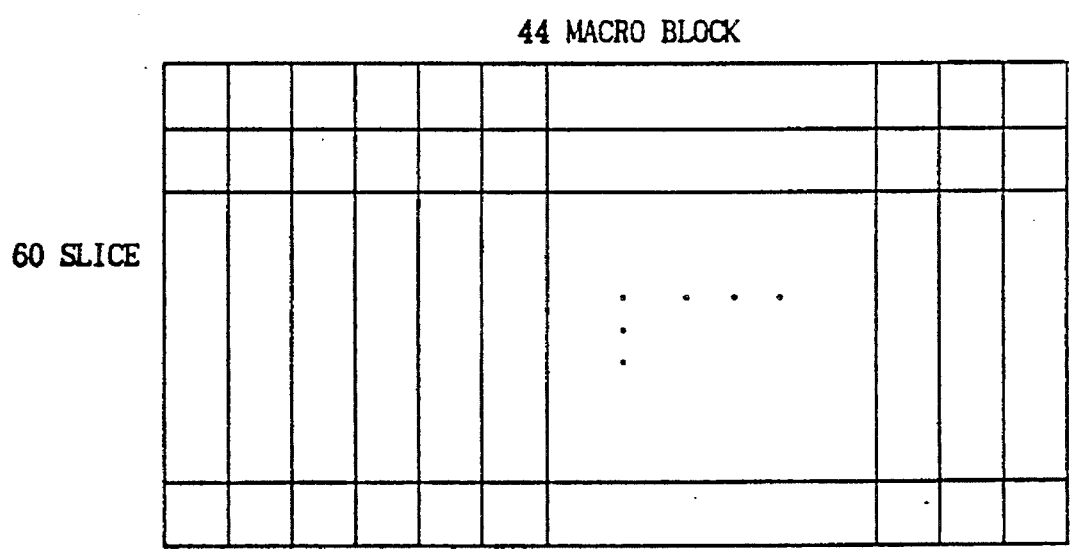
FIG. 2 is the schematic diagram of frame.
Figure 3:
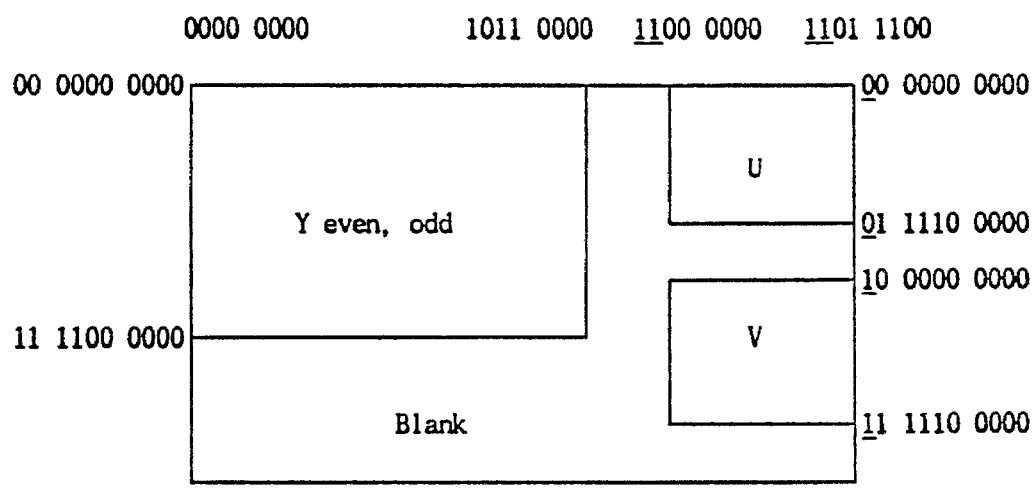
FIG. 3 is the schematic diagram of frame memory.

44 macroblocks shown in FIG. 2 shall be stored by 1 macroblock in memory shown in FIG. 3 in this way.

As frame data in this invention is stored in memory after 4 step parallel processing, which 4 slices shall be stored in case of 44 macroblock storage, next time store slice 5~slice 10 in this way.

Since the address implementation so as to store pixel data of frame to memory is carried out by raster format converter circuit in FIG. 5. ON signal shows the data existing period and, so that only necessary datas can be stored to memory as counter is not increased during data non-exisitng period.

That is, 10 bit counter(1), as counter counting 1 macroblock, shall be reset by macroblock start(MSC) signal. And slice number(SVP) & macroblock number(MACRO #) are supposed to be made in advance and the implementation is also possible by counter etc.

In the concrete, this can be explained together with Y processor(2) shown in FIG. 6 and C processor(3) in FIG. (7). Y processor(2) makes Y horizontal address(HY(7)~HY(O)) and Y vertical address(VY(9)~VY(O)) by using output of 10 bit counter(1) & slice number(SVP), macroblock number(MACRO #), and the processing progress is described in FIG. 8.

Figure 9:
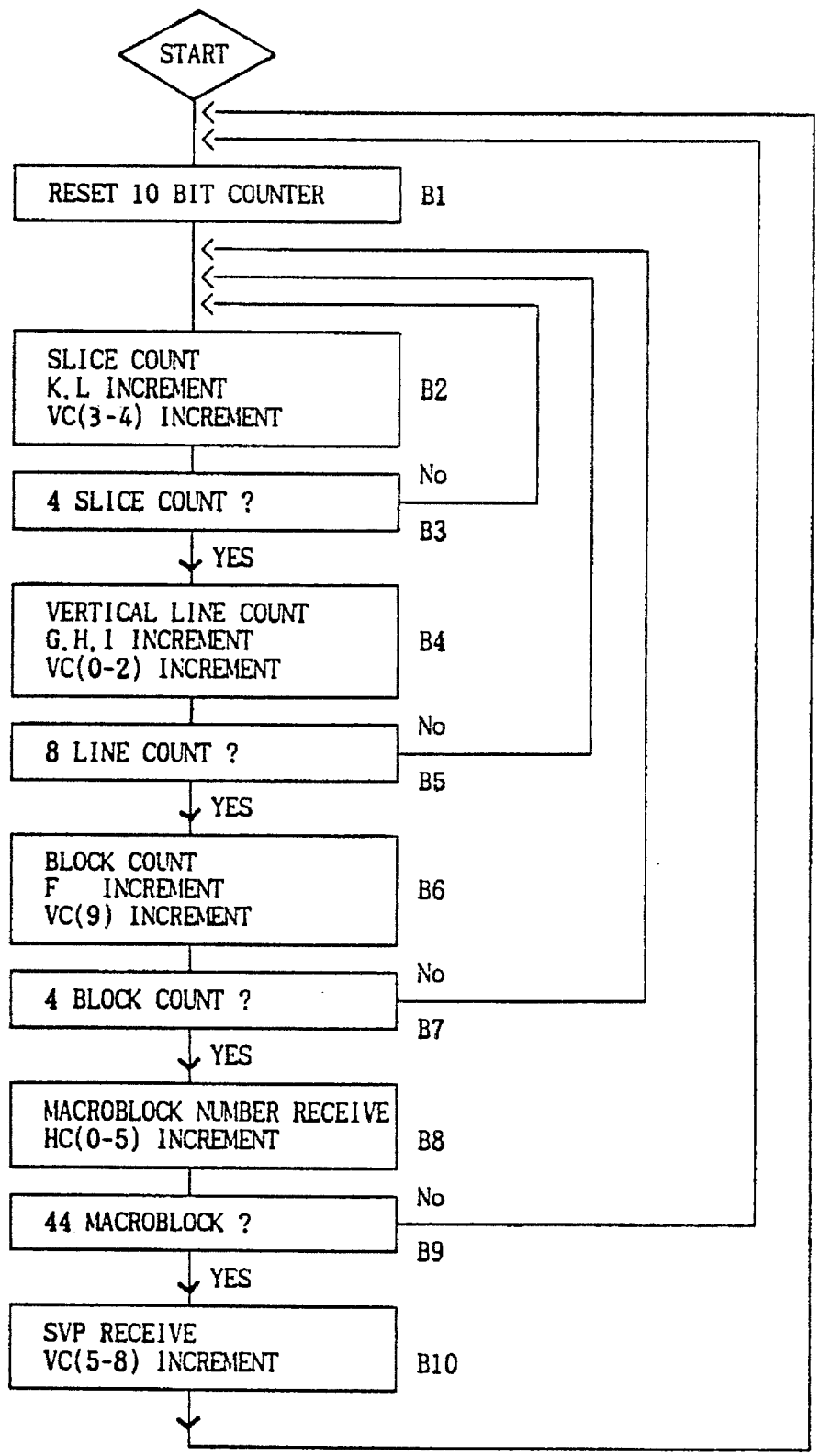
FIG. 9 is the flow chart to explain the operating order of C processor.

C processor(3) makes C horizontal address(HC(7)~HC(O)) and C vertical address(VC(9)~VC(O)) by using output of 10 bit counter(1) & slice number(SVP), macroblock number(MACRO #), and the processing progress is described in FIG. 9.

Like this, Y, C addresses made by Y processor(2) and C processor(3) select multiplexer (4) & (5) by using MSB marked C bit of 10 bit counter(I), which distinguishes Y and C, as YC section signal, so that the output of Y address can be made during Y period and the output of C address be done during C period. Thus, by using only one of 10 bit counter(1), the address which stores datas by block unit shall be made.

Figure 8:
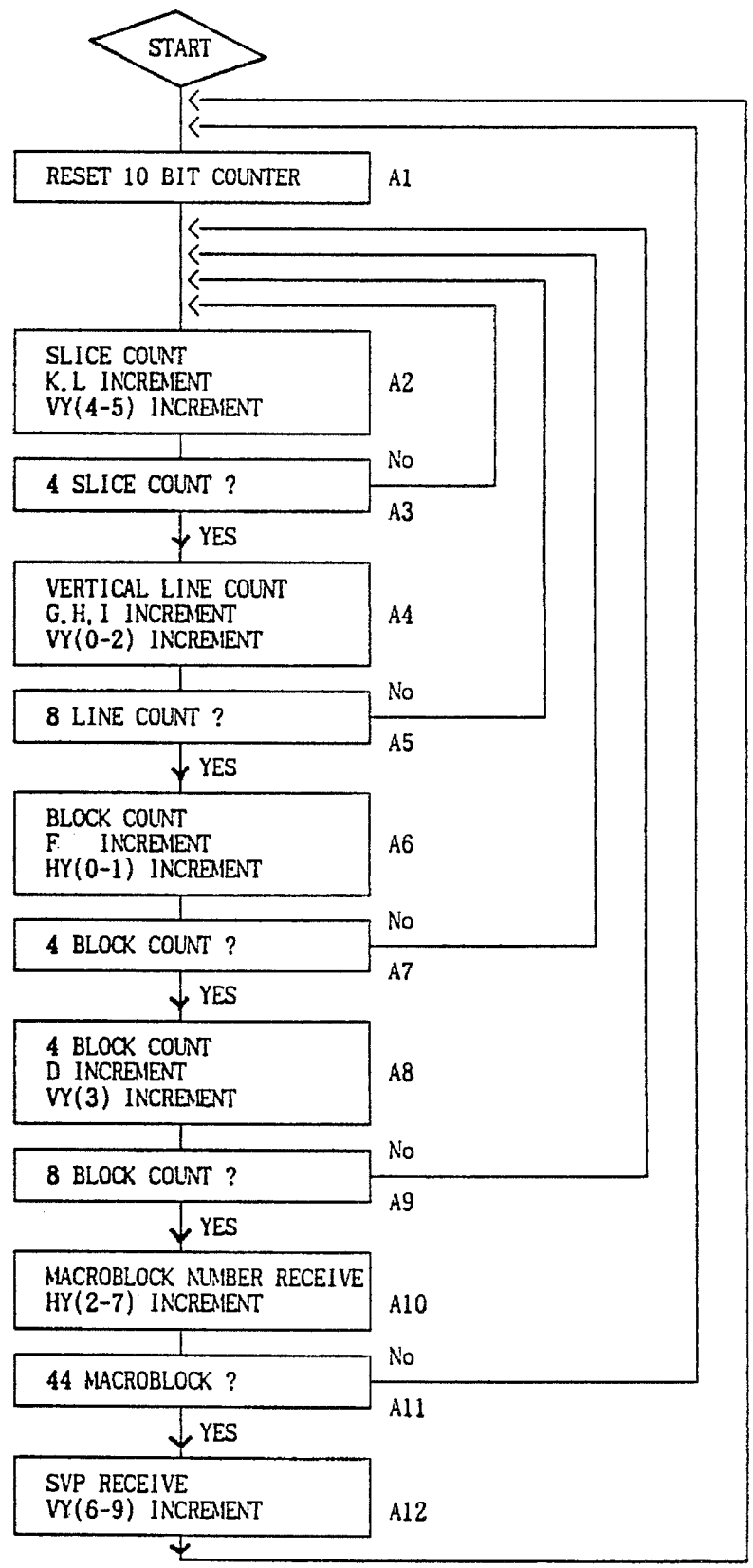
FIG. 8 is the flow chart to explain the operating order of Y processor.

In this invention, the operation of Y processor(2) for Y processing is done as FIG. 8. Reset(A1) 10 bit counter(I), then by the bit(K, L) increment to Y processor(2) due to data input, also be increased(A2) the luminance vertical address (VY(4~5)), check whether 4 parallel data(4 slice) is inputted and, if not, carry out(A3) again the said step(A2). As, by repeating this, 4 parallel data is increased to bit(G, H, I) to Y processor(2), vertical address(VY(O~2)) is also increased(A4). Subsequently, count whether 8 line data is inputted, if not, carry out the said step(A2) and, if so, carry out the next step(A5).

If 8 line data is inputted, as EF bit of Y processor(2) is increased, horizontal address(HY(O~1)) is also risen(A6).

Check whether 4 block data is inputted with such increment, if not, repeat to carry out from the said step(A2) and, if so, carry out the next step(A7). If 4 block data is inputted, D bit to Y processor(2) is increased, accordingly so is(A8) vertical address(VY(3)). Check whether 8 block datas are all inputted with such increment, if not, repeat to carry out from the said step(A2) and, if so, carry out the next step(A9).

Then, if 8 block datas are all inputted, by using macroblock number(MACRO #) shown in FIG. 5, increase(A10) vertical address(HY(2~7)). Thus, if 44 blocks are not all inputted, repeat to carry out from the said step(A1) and, if all inputted, carry out(All) the next step.

Subsequently, by using slice number(SVP) shown in FIG. 5, increase vertical address(VY(6~9)) and carry out(A12) Y processing.

On the other hand, in C processing of this invention, if resetting(B1) 10 bit counter(l) like FIG. 9, as data is inputted, bits(K, L) to C processor(3) are increased and so is(B2) vertical address(VC(3~4)). Thus, check whether 4 parallel datas are inputted, if not, carry out the said step(B2) again and, if so, carry out the next step(B3). If 4 parallel datas are inputted, as bits(G. H, I) to C processor(3) are increased, so is(B4) the vertical address (VC(0~2)). Thus, check whether 8 line datas are inputted, if not, repeat to carry out from the said step(B2) and, if so, carry out the next step(B5). If 8 line datas are inputted, as F bit to C processor(3) shown in FIG. 5 is increased, so is(B6) the vertical address(VC(9)).

Judge whether 4 block datas are inputted with such increment of vertical address, if not, repeat to carry out the said step(B2) and, if so, carry out the next step(B7).

In the aforementioned, if 4 block datas are inputted, C processor(3) increases(B8) horizontal address(HC(0~5)) by using macroblock number(MACRO #). Judge whether 44 macroblock datas are all inputted with the increment of horizontal address, if not, repeat to carry out again from the said step(B1) and, if so, carry out the next step(B9). If 44 macroblock datas are all inputted, increase vertical address (VC(5~8)) by using signal(SVP) shown in FIG. 5 and carry out(B10) C processing with repeating to carry out this from the said initial step(B1).

Like the above, as composing address generation circuit, which leads or lights the data consisted of block unit in HDTV with digital type to frame memory, by using only one 10 bit counter, this invention can get the saving effect of the cost for circuit implementation.

What is claimed is:

1. Raster format converter circuit for an HDTV system and in which a composing raster format converter is used as an address generator in a frame memory when using block transformation, comprising:

a bit counter for counting individual macroblocks in response to an ON signal appearing during a data existing period while disappearing during a non-existing period to count only during a data existing period;

a macroblock start signal for resetting said bit counter at the starting point of a macroblock;

a Y processor for generating horizontal illuminance and vertical address signals from the outputs of said ten bit counter and the SVP and Macro # signals;

a C processor responsive to the outputs of said bit counter and the SVP and Macro # signals for generating color difference horizontal and vertical address signals;

a first multplexer circuit for generating vertical address signals during an illuminance period and using said C address during a color difference period; and a second multiplexer circuit for generating horizontal address signals using the Y address during the illuminance period and the C address during the color difference period.

2. The raster format converter circuit according to claim 1, wherein said slice number is used as a maximum four bit address of the Y vertical address and also as the address of the C vertical address.

3. The raster format converter circuit according to claim 1, wherein said ten bit counter uses the maximum bit as the signal YC to distinguish the luminance Y and the color difference C periods.

4. The raster format converter circuit according to claim 1, wherein said macroblock number is used as the maximum six bits of the Y horizontal address and also as the minimum six bits of the C horizontal address.

5. The raster format converter circuit according to claim 1, wherein the minimum two bits of the ten bit counter are used as the Y vertical address to increase four slices in turn.

6. The raster format converter circuit according to claim 1, wherein the minimum two bits of the ten bit counter are used as the C verticl address to increase four slices in turn.

7. The raster format converter circuit according to claim 1, wherein the middle bit of said ten bit counter is used as the minimum three bits of the Y vertical address to count eight lines within a block.

8. The raster format converter circuit according to claim 1, wherein the middle bit of said ten bit counter is used as the minimum three bits of the C vertical address to count eight lines within the block.

9. The raster format converter circuit according to claim 1, wherein the other middle bit of said ten bit counter is used as the minimum two bits of the Y horizontal address to count the horizontal four blocks and one bit of said ten bit counter is used as the Y vertical address to distinguish the top and bottom four blocks, respectively.

10. The raster format converter circuit according to claim 1, wherein said C processor sets the maximum two bits of the C horizontal address HIGH to store the color difference signal data in the frame memory in a different field from the the illuminance signal and also, to store U, V data in the frame memory in a different field, uses the middle bit of the ten bit counter as the maximum bit of the C vertical address.

11. The raster format converter circuit according to claim 1, wherein the illuminance vertical address is increased until eight line data are input by repeating the input of four parallel data by four slices in regular order and after the input of eight data lines, the horizontal address is increased until four blocks of data are input and also increases the other illuminance vertical address until eight blocks of data are input, the remainder of the illuminace horizontal data is increased using the macroblock number until fourty-four macroblocks are input and the presenting process which repeats to increase the remainder of the luminance vertical address by four slices in turn.

* * * * *